April 13, 1926.  1,580,496
R. L. KELLY
FILM NEGATIVE HOLDER
Filed June 15, 1925
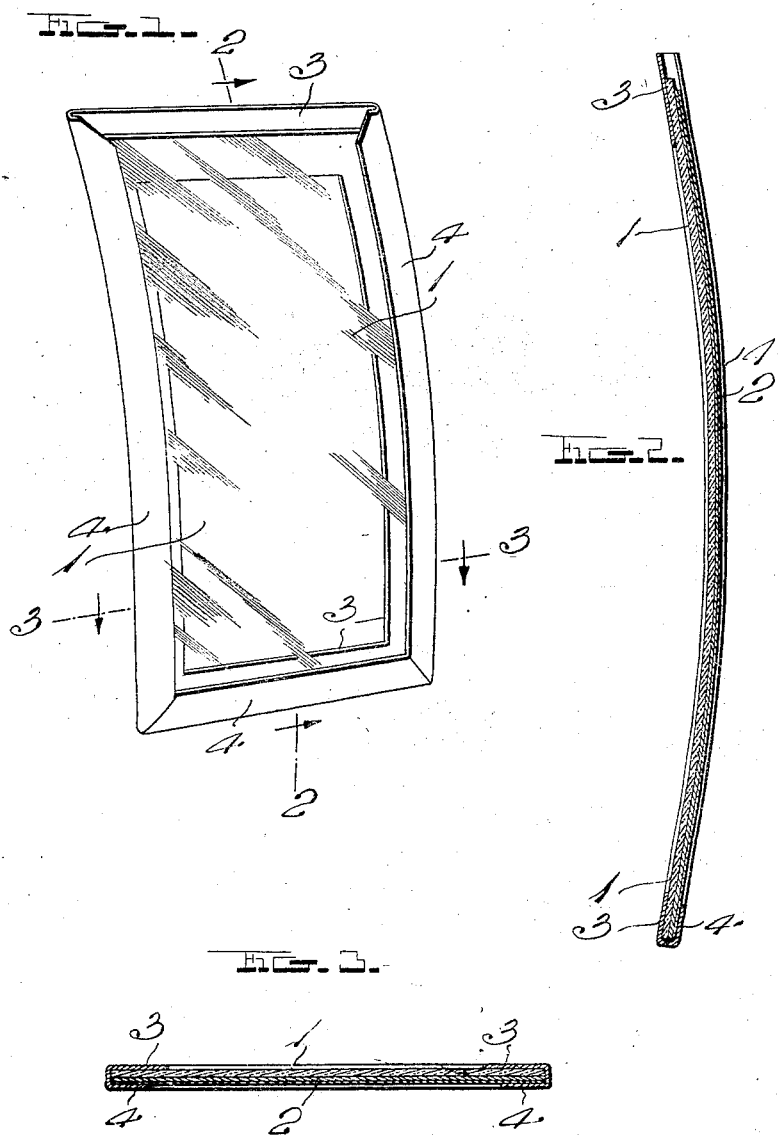
Witness
H. Woodard
Inventor
R. L. Kelly
By H. B. Wilson &co
Attorneys Patented Apr. 13, 1926.

1,580,496

UNITED STATES PATENT OFFICE.

ROBERT L. KELLY, OF PIERRE, SOUTH DAKOTA.

FILM-NEGATIVE HOLDER.

Application filed June 15, 1925. Serial No. 37,275.

*To all whom it may concern:*

Be it known that I, ROBERT L. KELLY, a citizen of the United States, residing at Pierre, in the county of Hughes and State of South Dakota, have invented certain new and useful Improvements in Film-Negative Holders; and I do declare the following to be a full, clear, and exact description of the invention, such as will enable others skilled in the art to which it appertains to make and use the same.

In holding photographic film negatives for retouching purposes, difficuly is encountered in holding them tightly against any surface, due to the tendency of the film to curl. It is one object of my invention however to provided a new method for holding the film, so that it will remain tightly against a support or base and will not yield beneath the retoucher's instruments.

A further object is to provide a novel form of film negative holding device which will tightly hold the film against the support or base.

With the foregoing in view, the invention resides in the novel subject matter hereinafter described and claimed, the description being supplemented by the accompanying drawing.

Figure 1 is a perspective view of a retouching frame constructed in accordance with my invention.

Figures 2 and 3 are sectional views as indicated by lines 2—2 and 3—3 of Fig. 1.

In the drawing above briefly described, the numeral 1 designates a convex base or support which is preferably formed of glass. The negative 2, to be retouched, is placed against the base or support 1, and is tightly held against the same. To perform this holding operation, as well as to retain the base 1, I provide a rectangular, longitudinally curved frame 3 which is preferably formed of metal, said frame having inturned flanges 4 at its lower end and its vertical sides to hold the base and the film in place.

A film negative curls toward its sensitized side and with my invention, I reverse the curvature of the film negative by longitudinally springing the latter, and then I hold the reversed curved film negative against the convex base 1, the holding being effected by the flanges 4 in the present instance, although other provision could be made for this purpose. By thus, reversely curving the film and holding what was previously its convex side against the support 1, the tension given to the film negative by reversing its curvature, effectively holds said film negative in tight contact with said support, so that it will not shift toward and from the same, during the retouching operation. Thus, much better results can be obtained than with the usual straight retouching frames.

I claim:

1. In a device for holding a film negative while retouching the same, a convex film negative support, and means for holding a film negative tightly against said support.

2. In a device for holding a film negative while retouching the same, a convex film negative supporting plate, and a curved frame containing said plate and having inturned flanges disposed at the convex side of said plate, said flanges being adapted to hold a film negative against said plate.

3. The method of holding a curled film negative while retouching the same, consisting in springing the film negative to reverse the curvature thereof, and securing the reversely curved film negative against a convex surface.

In testimony whereof I have hereunto affixed my signature.

ROBERT L. KELLY.